United States Patent Office 3,476,815
Patented Nov. 4, 1969

3,476,815
NONLINEAR POLYPHENYL ETHER SYNTHETIC LUBRICANTS
Albert L. Williams, Hopewell Township, Mercer County, and Robert E. Kinnney, Lawrence Township, Mercer County, N.J., assignors to Mobil Oil Corporation, a corporation of New York
No Drawing. Continuation-in-part of application Ser. No. 517,812, Dec. 30, 1965. This application Nov. 13, 1967, Ser. No. 682,520
Int. Cl. C07c 43/22
U.S. Cl. 260—613          1 Claim

ABSTRACT OF THE DISCLOSURE

A new class of nonlinear polyphenyl ether synthetic lubricants are prepared by reacting 2,4-diphenoxyphenyl bromide with phenolic compounds, by the Ullmann ether synthesis. These polyphenyl ethers have a branched configuration in which at least one internal phenyl group has more than two phenoxy group substituents. The nonlinear polyphenyl ethers display lubricant and stability characteristics comparable to those of the linear polyphenyl ethers.

CROSS-REFERENCES TO RELATED APPLICATIONS

This application is a continuation-in-part of copending application Ser. No. 517,812, filed Dec. 30, 1965, now abandoned.

BACKGROUND OF THE INVENTION

Field of the invention

This invention is directed to novel polyphenyl ethers. It is more particularly concerned with novel nonlinear polyphenyl ethers.

Description of the prior art

As is well known to those familiar with the art, polyphenyl ethers have been proposed as lubricants for use in extreme environments, such as high temperatures. Such polyphenyl ethers, however, have been linear in configuration, i.e., having a chain of phenyl groups linked through oxygen, such as:

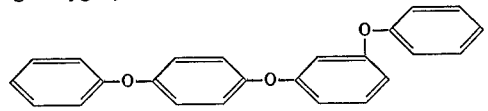

Although, as shown, the linkages can be in any of the o, m, and p positions, the ether viewed in its entirety is a linear material. No internal phenyl group of the chain has more than two phenoxy substituents.

Discovery of a new diphenoxyphenyl halide, 2,4-diphenoxybromobenzene, now makes it possible to produce nonlinear polyphenyl ether synthetic lubricants. By the term "nonlinear polyphenyl ether" is meant, as shown in the structural formula set forth hereinafter, a polyphenyl ether in which at least one of the internal phenyl groups has more than two phenoxy group substituents, i.e., the polyphenyl ether has a branched configuration.

SUMMARY OF THE INVENTION

This invention provides novel nonlinear polyphenyl ethers having the formula:

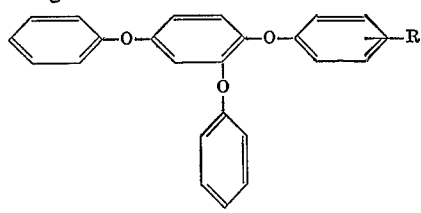

wherein R is selected from the group consisting of phenoxy and 2,4-(diphenoxy)phenoxy.

DESCRIPTION OF SPECIFIC EMBODIMENTS

The compounds of this invention can be prepared by using the well-known Ullmann ether synthesis. They are more feasibly prepared, however, by an improved synthesis described in copending application Ser. No. 490,072, filed Sept. 24, 1965. Briefly, that method involves reacting, in the absence of molecular oxygen, an alkali metal salt of at least one phenol reactant selected from the group consisting of a monohydric phenolic compound reactant and a dihydric phenolic compound reactant with an aryl halide reactant in the presence of a copper salt catalyst and in a solvent that forms coordinate covalent bonds with copper ions.

Applying this synthesis specifically to the aforementioned 2,4-diphenoxybromobenzene, as the aryl halide reactant, with monohydric or dihydric phenol compound reactants, a wide variety of novel nonlinear polyphenyl ethers can be produced.

Thus, various monohydric phenolic compound reactants can be used. The aromatic nucleus can be benzene or it can be a condensed ring aromatic nucleus, such as naphthalene and phenanthrene. The monohydric phenolic compound reactant can, if desired, contain ring substituents, such as aryl, alkyl, aroxy, alkoxy, chloro, fluoro, acyl, ester, and nitro groups. Nonlimiting examples of the monohydric phenolic compound reactants are phenol; m-amoxyphenol; phenoxyphenol; p-butoxyphenol; o-butylphenol; p-tert-butylphenol; o-chlorophenol; 2-chloro-4-nitro-phenol; 6-chloro-2-phenylphenol; p-chlorophenol; 2-4-dichlorophenol; p-ethoxyphenol; m-ethylphenol; m-nitrophenol; m-phenylphenol; p-propylphenol; p-hydroxyacetophenone; α-naphthol; B-naphthol; 2-butyryl-1-naphthol; 1-chloro-2-naphthol; 1-metyl-2-naphthol; 2-phenanthrol; 4-phenanthrol; and 9-phenanthrol.

A wide variety of dihydric phenolic compound reactants can be used. The hydroxyl groups can be on the same aromatic nucleus or on different aromatic nuclei on the molecule. In the latter case the aromatic nuclei can be joined directly (e.g., diphenyl) or through a linking molecule (e.g., diphenylether, diphenylpropane, and diphenylhexafluoropropane). The dihydric phenolic compound reactants can, if desired, contain ring substituents, such as aryl, alkyl, aroxy, alkoxy, chloro, fluoro, trifluoroalkyl, acyl, ester, and nitro groups. Non-limiting examples of the dihydric phenolic compound reactants are resorcinol; catechol; hydroquinone; 2,2'-dihydroxydiphenyl; 2,4'-dihydroxydiphenyl, 2,7-dihydroxynaphthalene; 3,4-dihydroxyphenanthrene; 4 - methoxyresorcinol; 4-methylresorcinol; 4-benzoylresorcinol; 4-isobutylresorcinol; 2-methoxyresorcinol; 2,4-dinitroresorcinol; 2-acetylhydroquinone; 3,3'-dimethyl-p,p'biphenol; bis(p-hydroxyphenyl)ether, bis(4 - hydroxy-3-nitrophenyl)ether; bis(4-hydroxy - 3 - chlorophenyl)ether; bis(p - hydroxyphenyl)methane; 1,2 - bis(m-hydroxyphenyl)ethane; 2,2 - bis(m-hydroxyphenyl)butane; 2,2 - bis(p - hydroxyphenyl) - 4-methylpentane; 2,2-bis(m-hydroxyphenyl)-n-heptane; 2,2-bis(4 - hydroxy - 3 - isopropyl)propane; bis(4 - hydroxy-3-chlorophenyl)methane; bis-(4 - hydroxy - 5 - nitrophenyl)methane; bis(4-hydroxy-2,6-dimethyl - 3 - methoxyphenyl)methane; 2,2 - bis(p - hydroxyphenyl)hexafluoropropane; 2,2-bis(m-hydroxyphenyl)octafluorobutane; 2,2-bis(p-hydroxyphenyl)tetradecafluoroheptane; 2,2-bis-(4 - hydroxy-3-isopropylphenyl)hexafluoropropane; and bis(4-hydroxy-3-chlorophenyl)hexafluoropropane.

In order to undergo the polyphenyl ether synthesis, monohydric or the dihydric phenolic compound reactant is converted into its alkali metal salt. This can be accomplished by known methods of reacting the hydroxyl group with a basic alkali metal compound such as the alcoholate (methoxide), hydride, or hydroxide. Although any basic alkali metal compound can be used, the sodium and potassium compounds are generally used and are preferred. When both hydroxyl groups of a dihydric phenol are to be reacted with an aryl halide, both must be converted to the alkali metal salt, i.e., using substantially stoichiometric amounts of the basic alkali metal compound. If, on the other hand, it is desired to leave one hydroxyl group unreacted, as in the preparation of a phenoxyphenol, for example, this can be encouraged by leaving a portion of the hydroxyl groups free. An excess of basic compound should be avoided, because it interferes with the reaction and reduced yield. Water also slows the reaction and reduced yield. Accordingly, as when the aqueous KOH or NaOH is used, steps should be taken to remove water, such as by azeotropic distillation with benzene, toluene, or the like.

The reaction between the alkali metal salt of the monohydric or the dihydric phenolic compound reactant and the 2,4-diphenoxybromobenzene reactant is catalyzed by copper salts. Cupric and cuprous salts can both be used. Utilizable catalysts include cuprous chloride, cupric chloride, cuprous bromide, cupric bromide, cupric acetate, cupric sulfate, cupric acetylacetonate, and cuprous sulfate. Water appears to slow the reaction ad decrease yields. Accordingly, in preferred practice, anhydrous copper salts should be used. The amount of catalyst used does not appear to be a critical factor. In practice, the process has been carried out using as little as 0.01 mole copper salt and as much as 0.25 mole per mole dihydric phenolic compound reactant.

An essential aspect of the process of this invention is the use of a suitable solvent. The solvents utilizable herein are characterized by the fact that they are polar organic solvents that form coordinate covalent bonds with copper ions. Thus, they will contain heteroatoms, such as sulfur, oxygen, nitrogen, and phosphorous. The utilizable solvents dissolve at least part of the copper catalyst and the phenate salt reactant. Non-limiting examples of solvents are amylamine; di - n - propylamine; di-n-butyl amine; 2-ethylhexylamine; n-decylamine; caprolactom; N,N-diethylformamide; N,N-dimethylformamide, N-ethylacetamide; dimethyl sulfoxide; dipropyl sulfoxide; diheptyl sulfoxide; dimethyl sulfone; diethyl sulfone; di-nipropyl sulfone; pyridine; pyridine-N-oxide; quinoline-N-oxide; coumarone; benzothiophene; indole; collidine; pyrazole; thiazole; 2,3-dimethylthiophene; 2-methylthiophene; 1-methyl-2-pyrrolidinone; hexamethyl phosphoramide; di-n-butylether; di-isoamylether; diheptylether; and bis(2-methoxyethyl)ether.

The process is readily carried out at temperatures between about 50° C. and about 200° C. Higher temperatures can be used, but they generally serve no useful purpose. Preferably, temperatures between about 100° C. and about 175° C. will be used. In many cases, operating at or near refluxing temperature is satisfactory, such as with pyridine (about 117° C.). The time of reaction will be between about one hour and about 15 hours

EXAMPLE 1

A 500 ml. flask was fitted with a nitrogen inlet tube, a one foot Vigreux column, and a stirrer to prepare a solution of 55.8 g. (0.300 mole) of metaphenoxyphenol in 200 ml. of pyridine. The solution was made at room temperature under a nitrogen atmosphere. The nitrogen covers the reaction mixture during all reactions in the flask. Stirring was continued while 15.6 (0.288 mole) of sodium methylate were added slowly. Then 135 ml. of methanol-pyridine mixture were distilled out through the Vigreux column over a period of one hour. When the flask has cooled enough to stop boiling, the column was replaced by a reflux condenser. Then, 67.9 g. (0.199 mole) of 2,4-diphenoxybromobenzene were added. This was washed in with 25 ml. of pyridine, and followed at once by 2 g. of cuprous chloride. The mixture was refluxed with stirring for four hours. Pyridine was then distilled out until the pot temperature reached 160° C.

The reaction mixture was poured into a solution of 50 ml. of concentrated hydrochloric acid in 500 ml. of water and allowed to stand overnight. After decanting off the aqueous layer, the crude product was dissolved in 430 ml. of benzene. This benzene solution was then washed by 20 ml. of hydrochloric acid in 200 ml. of water, and again by 10 ml. of hydrochloric acid in 100 ml. of water. Unreacted meta-phenxyphenol was extracted into 12 g. of sodium hydroxide in 150 ml. of water, used in two equal portions. The benzene solution was then washed with 100 ml. of water. Benzene was removed by distillation at atmospheric pressure. Distillation was continued at 0.5 mm. of Hg to give a distilled product boiling at 262–268° C. The yield of 1-(meta-phenxyphenoxy)-2,4-diphenoxy-benzene was 35.8 g. (40% based on 2,4-diphenoxy-bromobenzene). Gas chromatography indicated 99+ percent purity. This is a new compound.

EXAMPLE 2

The non-linear polyphenyl ether of Example 1 was tested for lubricant properties in comparison with a linear polyphenyl ether having the same number of phenyl and oxygen moities, a bis(phenoxyphenoxy)-benzene, mixed isomers (5P4E). Tests were for Pour Point (ASTM D97–57) and Kinematic Viscosity (ASTM D445–61). Oxidation stability was measured as the time for absorbing 0.5 mole or 1.0 mole $O_2$ per kg. of oil at 600° F., using the method of Dornte, Ind. Eng. Chem., 28, 26 (1936). Test results are set forth in the table.

TABLE

|  | Example 1 | 5P4E |
|---|---|---|
| Pour Point, ° F | 45 | 40 |
| Kinematic Viscosity, cs.: |  |  |
| At 130° F | 154.7 | 93.20 |
| At 210° F | 15.54 | 13.11 |
| At 400° F | 2.00 | 2.19 |
| Oxygen Absorption, hrs.: |  |  |
| 0.5 mole | 11.3 | 10.5 |
| 1.0 mole | 15.3 | 12.4 |

EXAMPLE 3

A 500 ml. flask was fitted with a nitrogen inlet tube, a stirrer, and a condenser over a Dean-Stark trap. A solution of 11.0 g. (0.10 mole) of resorcinol in 120 ml. of benzene was prepared in the flask under nitrogen. Nitrogen is kept over all reactions in the flask. Stirring was continued while 10.2 g. (0.19 mole) of sodium methylate were added. Benzene and methanol were distilled off to give the disodium salt of resorcinol as a white powder. After the trap had been removed 100 ml. of pyridine were added and the mixture was heated. When the temperature had reached 110° C., 68.2 g. (0.20 mole) of 2,4-diphenoxybromobenzene were added. This was followed by the addition of 2.0 g. of cuprous chloride. The reaction mixture was brought to boiling and held at reflux under nitrogen, with stirring, for 25 hours.

The reaction mixture was poured into a solution of 130 ml. of concentrated hydrochloric acid in 300 ml. of water. The product was extracted into 300 ml. of benzene. After separation, the benzene layer was filtered and washed with 100 ml. of water. The benzene solution was then extracted by a solution of 6 g. of potassium hydroxide in 100 ml. of water, and again by 25 g. of potassium hydroxide in 300 ml. of water. Aqueous emulsion in the benzene was removed by two 100 ml. washes with 10% sodium chloride solution. This was followed by three 100 ml. water washes. Benzene was removed by distillation at atmospheric pressure. Distillation was then continued at 0.08 mm. of Hg. to remove unreacted bromide and meta-diphenoxy-benzene formed by debromination. The crude product (21.1 g.) remained in the pot as a viscous oil. This was dissolved in 240 ml. of 50–50 acetone-methanol. The solvent was evaporated slowly at room temperature. When nearly all the solvent was gone, the crystals were filtered off and washed with cold acetone-methanol. The crude crystals (18.5 g.) were recrystallized from 850 ml. of hot ethanol to give 7.5 g. of purified metabis (2,4-diphenoxy-phenoxy)benzene, melting at 111–113° C. This new compound was obtained in 12% yield from resorcinol.

*Analysis.*—Calculated: C, 79.99%; H, 4.79%. Found: C, 79.23%; H, 4.61%.

As is described in the working examples, nonlinear polyphenyl ethers can be made from monohydric and dihydric phenol reactants. It will be apparent to those skilled in the art that a wide variety of other nonlinear polyphenyl ether synthetic lubricants can be produced by proper selection of the phenol reactant to react with one or, in the case of dihydric phenol reactants, two moles of 2,4-diphenoxybromobenzene.

Although the present invention has been described with preferred embodiments, it is to be understood that modifications and variations may be resorted to, without departing from the spirit and scope of this invention, as those skilled in the art will readily understand.

What is claimed is:
1. A nonlinear polyphenyl ether having the formula:

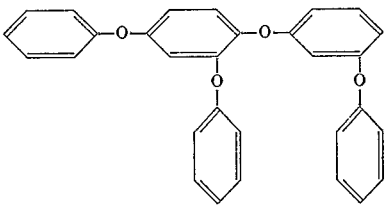

References Cited

UNITED STATES PATENTS 3,374,175   3/1968   Sax et al. _____ 260—613 XR

BERNARD HELFIN, Primary Examiner

U.S. Cl. X.R.

252—52

PO-1050
(5/69)

UNITED STATES PATENT OFFICE
CERTIFICATE OF CORRECTION

Patent No. 3,476,815    Dated November 18, 1969

Inventor(s) ALBERT L. WILLIAMS & ROBERT E. KINNEY

It is certified that error appears in the above-identified patent and that said Letters Patent are hereby corrected as shown below:

Column 2, line 32:  for "p-chlorophenol"
          read --p-cyclohexylphenol--

Column 4, line 16:  for "1-(meta-phenxyphenoxy)"
          read --1-(meta-phenoxyphenoxy)--

SIGNED AND
SEALED
FEB 24 1970

(SEAL)
Attest:

Edward M. Fletcher, Jr.
Attesting Officer

WILLIAM E. SCHUYLER, JR.
Commissioner of Patents